United States Patent
Yamamoto

(10) Patent No.: US 8,683,885 B2
(45) Date of Patent: Apr. 1, 2014

(54) FRICTION TYPE TRANSMISSION DEVICE AND PRESSING FORCE CONTROL METHOD FOR FRICTION TYPE TRANSMISSION DEVICE

(75) Inventor: Takeshi Yamamoto, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 687 days.

(21) Appl. No.: 12/919,152

(22) PCT Filed: Feb. 19, 2009

(86) PCT No.: PCT/JP2009/052891
§ 371 (c)(1),
(2), (4) Date: Aug. 24, 2010

(87) PCT Pub. No.: WO2009/107543
PCT Pub. Date: Sep. 3, 2009

(65) Prior Publication Data
US 2011/0053732 A1 Mar. 3, 2011

(30) Foreign Application Priority Data
Feb. 26, 2008 (JP) ................................. 2008-043693

(51) Int. Cl.
*F16H 13/06* (2006.01)

(52) U.S. Cl.
USPC .................................. 74/325; 74/335; 476/59

(58) Field of Classification Search
USPC ....................................... 74/325, 335; 476/59
See application file for complete search history.

(56) References Cited

U.S. PATENT DOCUMENTS

| 7,575,535 B2 | 8/2009 | Yamamoto |
| 2005/0143211 A1 | 6/2005 | Yamamoto |
| 2008/0207378 A1 | 8/2008 | Yamamoto |
| 2008/0220931 A1 | 9/2008 | Yamamoto |

FOREIGN PATENT DOCUMENTS

| EP | 1 808 617 A1 | 7/2007 |
| JP | 8-277896 A | 10/1996 |
| JP | 2005-188701 A | 7/2005 |
| JP | 2005-256950 A | 9/2005 |
| JP | 2006-132738 A | 5/2006 |
| JP | 2007-187275 A | 7/2007 |

*Primary Examiner* — William C Joyce
(74) *Attorney, Agent, or Firm* — Foley & Lardner LLP

(57) ABSTRACT

In a friction drive transmission apparatus arranged to transmit power by a frictional transmission force between two roller units pressed against each other, there is provided a pressing force imparting means to increase and decrease a pressing force imparted to a roller pair to vary the frictional transmission force between both roller units smoothly at the time of a shift.

14 Claims, 14 Drawing Sheets

DRIVING ROLLER 1

DRIVEN ROLLER 2

FRICTION TYPE TRANSMISSION DEVICE AND PRESSING FORCE CONTROL METHOD FOR FRICTION TYPE TRANSMISSION DEVICE

TECHNICAL FIELD

The present invention pertains to a technical field of a friction drive transmission apparatus or device using a plurality of friction drive roller pairs.

BACKGROUND ART

A friction drive transmission apparatus of earlier technology is arranged to vary an inter-axis distance of each roller pair between the axes by rotating an eccentric shaft, and thereby to achieve a shift by changing over a roller pair operative for power transmission. This friction drive transmission apparatus can obtain a greater driving power transmission capacity by transmitting power by a traction drive. (cf. a patent document 1)

Patent Document 1: JP 2005-188701 A

DISCLOSURE OF INVENTION

Problem to be Solved by the Invention

However, in the friction drive transmission apparatus of the earlier technology, there appears a rotational speed difference between the rollers of a roller pair for an amount corresponding to a step ratio during a shift. Therefore, because of heat generation caused by this rotational speed difference, a traction coefficient (dimensionless quantity obtained by diving a tangential force of a rolling direction by a normal force) between both rollers becomes smaller, and a frictional transmission force or transmitted force decreases largely, so that a shift shock might be incurred.

The present invention has been devised in consideration of the above-mentioned problem, and its object is to provide a friction drive transmission apparatus and a pressing force control method or process for the friction drive transmission apparatus capable of reducing a shift shock at the time of a shift.

Means for Solving the Problem

To achieve the above-mentioned object, according to the present invention, there is provided a pressing force imparting means or device to increase/decrease a pressing force applied to a roller pair so that a frictional transmission force during a shift operation is varied smoothly.

BEST MODES FOR CARRYING OUT THE INVENTION

Hereinafter, best mode(s) for implementing the friction drive transmission apparatus according to the present invention is explained on the basis of embodiments 1~11.

Embodiment 1

First, the construction is explained.

Figure 1:
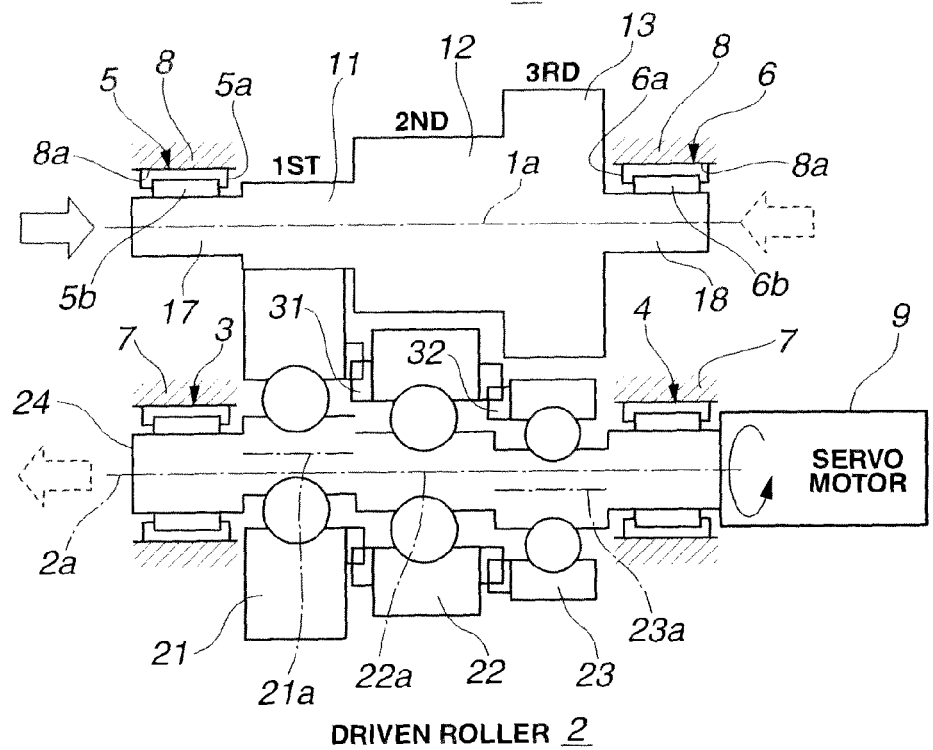
FIG. 1 is a general view showing a 3 forward speed, one reverse speed transmission apparatus according to a first embodiment.

FIG. 1 is a general view showing a 3 forward speed, 1 reverse speed friction drive transmission apparatus according a first embodiment. The transmission apparatus of the first embodiment is provided in a drive system of a vehicle driven by an engine. This transmission apparatus includes a driving roller 1 (driving roller unit) and a driven roller 2 (driven roller unit) which are supported rotatably, which are held in press contact with each other, and which are arranged to transmit motive power from one roller 1 or 2 of the two rollers 1 and 2, to the other roller 2 or 1, by a frictional force produced in the contact portion therebetween.

Driving roller 1 (driving roller unit) is an integral member including a first speed driving roller 11, a second speed driving roller 12, a third speed driving roller 13, and driving roller support shaft portions 17 and 18 which are integrally formed. The roller radii are so set that first speed driving roller 11<second speed driving roller 12<third speed driving roller 13. First speed driving roller 11, second speed driving roller 12 and third speed driving roller 13 are arranged in this order from the left of FIG. 1, between the driving roller support shaft portions 17 and 18.

Driven roller 2 (driven roller unit) includes a first speed driven roller 21, a second speed driven roller 22, a third speed driven roller 23, and an eccentric driven roller shaft (eccentric shaft) 24. The roller radii are so set that first speed driven roller 21>second speed driven roller 22>third speed driven roller 23. First speed driven roller 21, second speed driven roller 22 and third speed driven roller 23 are mounted, in this order from the left of FIG. 1, on the eccentric driven roller shaft 24.

The three driven rollers 21, 22 and 23 are mounted on eccentric driven roller shaft 24 provided with a first support bearing 3 and a second support bearing 4 at both ends of driven roller shaft 24, and arranged to enable changeover among three roller pairs of different gear ratios.

The three roller pairs are so arranged that a pressing force is applied to the three roller pairs by abutment of cams (cam members) 8 provided in a frame 7, against driving roller support bearings (rotation support portions) 5 and 6 set, respectively, at the driving roller support shaft portions 17 and 18.

Each cam 8 includes two cam slope surfaces 8a and 8b (cf. FIG. 2) forming an angle α with respect to a tangential line at a contact point between driving roller 1 and driven roller 2. In dependence on the rotational direction, the cam surface 8a or 8b of each cam 8 abuts against a cam follower 5a or 6a of drive roller support bearing 5 or 6. By this abutment, the cams 8 press the roller pair together in press contact. The cam slope surface 8a is a forward rotation cam sloping surface for bringing the roller pair in press contact by abutting against cam follower 5a or 6a in the case of forward torque (torque transmitted when the vehicle is driven forwards). The cam slope surface 8b is a reverse rotation cam sloping surface for bringing the roller pair in press contact by abutting against cam follower 5a or 6a in the case of reverse torque (torque transmitted when the vehicle is driven backwards). Each of the driving roller support bearings 5 and 6 includes the cam follower (fixed portion) 5a or 6a serving as an outer race, and needles (rotational portion) 5b or 6b serving as rolling elements.

The three driven rollers 21, 22 and 23 are rotatably mounted, through balls or the like, on the eccentric driven roller shaft 24 supported, at both ends, by first and second support bearings 3 and 4. A servo motor 9 for rotating the eccentric driven roller shaft 24 is provided at one end of eccentric driven roller shaft 24. At the time of a shift command, servo motor 9 rotates the eccentric driven roller shaft 24, and thereby makes it possible to change over from one of the three roller pairs having different gear ratios to another pair by moving one axis which is one of driven roller rotation axes 21a, 22a and 23a and which corresponds to a before-shift position before the shift, away from a driving roller rotation axis 1a, and moving one axis which is one of driven roller rotation axes 21a, 22a and 23a and which corresponds to an after-shift position after the shift, toward the driving roller rotation axis 1a.

The roller pairs are: a first speed roller pair 11, 21, a second speed roller pair 12, 22 and a third speed roller pair 13, 23. Between first and second support bearings 3 and 4 which are bearings supporting both ends of driven roller 2, the first speed driven roller 21, second speed driven roller 22 and third speed driven roller 23 are arranged in sequence from the first support bearing 3. The first speed driven roller 21, second speed driven roller 22 and third speed driven roller 23 are connected by a first connecting portion 31 and a second connecting portion 32 so that the rollers can move radially relative to each other and the rollers are connected as a unit in the rotational direction. A driving input to the friction drive transmission apparatus is introduced from one of the driving roller support shaft portions 17 and 18, and an output from the friction drive transmission apparatus is taken out in the radial direction from the second speed driven roller 22 or in the axial direction.

Figure 2:
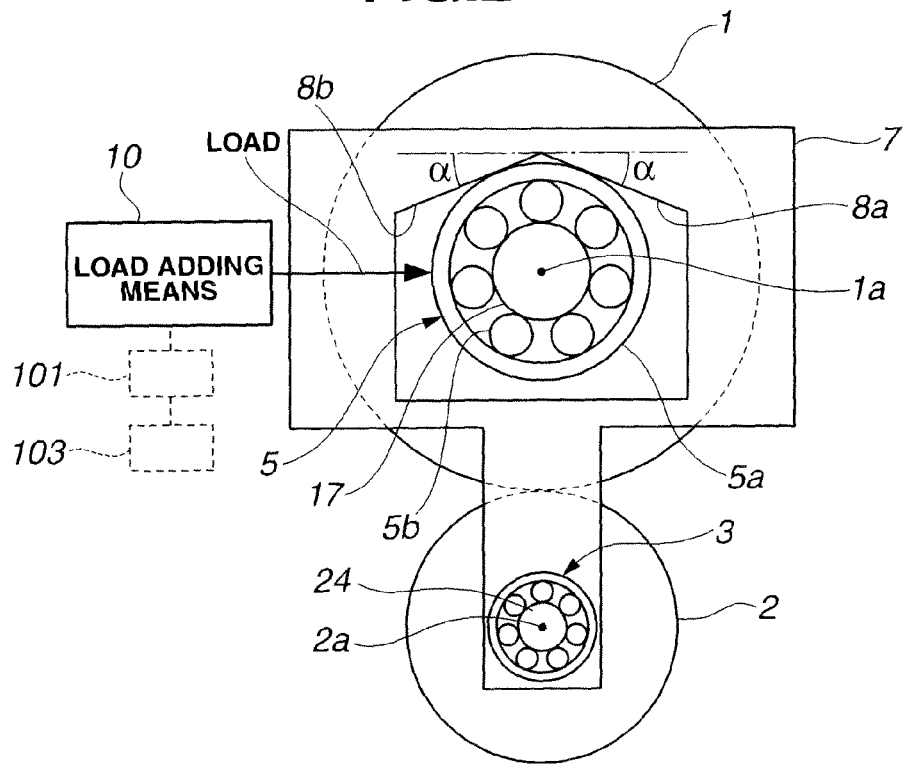
FIG. 2 is a side view showing the construction of a friction drive transmission apparatus according to the first embodiment.

FIG. 2 is a side view showing the construction of the friction drive transmission apparatus according to the first embodiment. The friction drive transmission apparatus according to the first embodiment includes pressing force imparting means or device(s) to vary or increase/decrease a pressing force pressing the rollers in press contact so as to vary the friction transmission force between the rollers smoothly at the time of a shift of changing over the roller pair operative for transmitting power from one pair to another by rotating the eccentric driven roller shaft 24. The or each pressing force imparting means is composed of the above-mentioned cam 8 and load adding means or device 10 to vary or increase/decrease the pressing force applied to the rollers 1 and 2, through the cam slope surface 8a, by applying a load from an arrow direction shown in FIG. 2 to the cam follower 5a, 6a of the driving roller support bearing 5, 6. This arrangement of increasing and/or decreasing the pressing force through cam slope surface 8a, instead of increasing and decreasing the pressing force directly, makes it possible to imparting the pressing force of a great magnitude with addition of a light load, and thereby makes it possible to reduce the size of the load adding means 10 and to simplify the construction of the load adding means 10.

Figure 3:
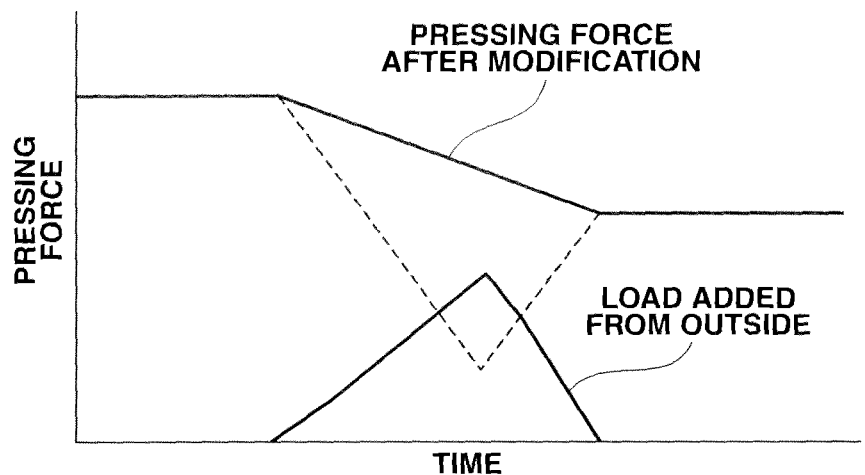
FIG. 3 is a time chart of a pressing force for showing a load adding method according to the first embodiment.

When the pressing force produced by cams 8 is decreased at the time of a shift, the load adding means or device 10 varies the load applied to driving roller support bearings 5 and 6 in a direction to vary the load so as to produce a pressing force making up for the decrease of the pressing force (FIG. 3). In the first embodiment, the direction of the load added by the load adding means 10 is oriented to form an angle of approximately 90 degrees with the direction of the pressing force.

Next, explanation is given to the impartment of the pressing force by cams 8. When a torque is transmitted from driving roller 1 to driven roller 2, a reaction force of the transmission force is applied to driving roller 1. Although the reaction force of the transmission force is supported by the abutment portions of the cam followers 5a, 6a of the driving roller support bearings 5, 6 and the cam slope surfaces 8a, the abutment portions produce only a force perpendicular to the contact surface. Therefore, a great normal force is produced, and a horizontal component in the horizontal direction balances with the reaction force of the transmission force. A vertical component in the vertical direction of this normal force acts, as the pressing force, to the contact portion between the rollers 1 and 2.

In this case, the ratio between the horizontal component and the vertical component, that is the ratio between the transmission force and the pressing force, is equal to the angle α of the cam slope surface 8a at the contact portion. Since the angle α of cam slop surface 8a is constant, this arrangement can apply the pressing force proportional to the transmission force, to the driving power transmitting portion. Thus, this arrangement can improve the life duration and power transmitting efficiency by providing the pressing force proportional to the transmission force with a simple construction using no wedge roller and no actuator.

Figure 4:
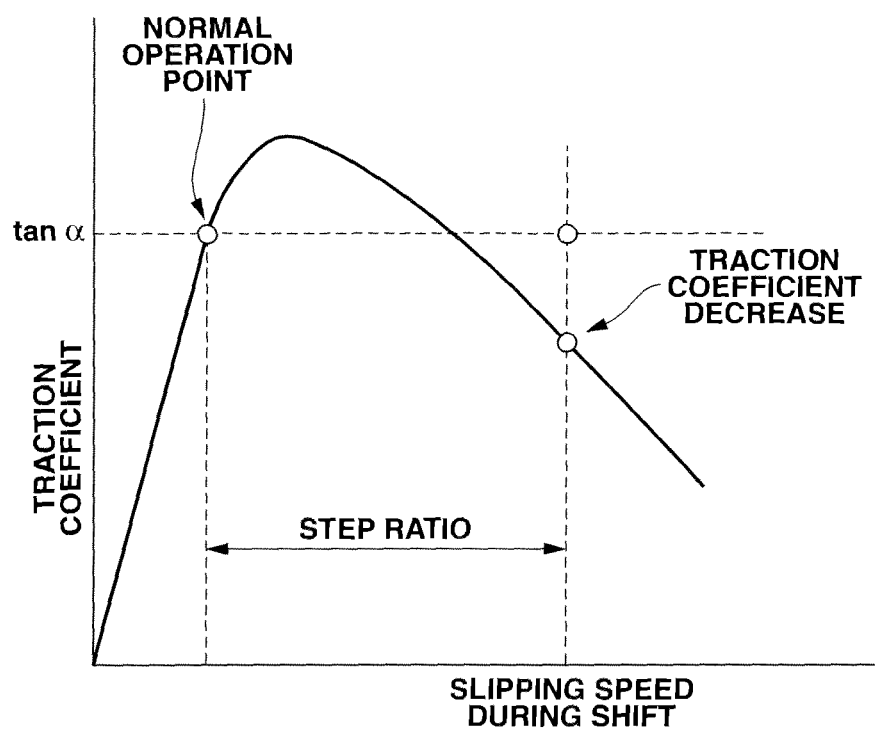
FIG. 4 is a view showing a traction characteristic with respect to variation of slip during a shift.
Figure 5:
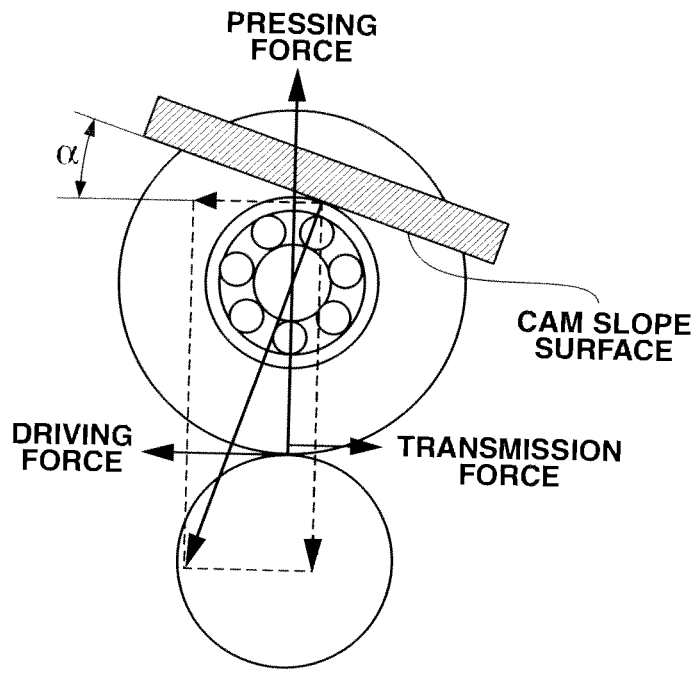
FIG. 5 is a side view of the friction drive transmission apparatus for illustrating a relationship between the transmission force and the pressing force.

Explanation is given to operations of the load adding means or device 10. In a traction drive type transmission apparatus for transmitting power with rheological characteristic of an oil pressure in the contact surface, the peripheral or circumferential speeds of the rollers at the time of a shift operation are related to a traction coefficient μ in the following manner. At an instant of the shift, the peripheral speeds of the rollers differ by an amount corresponding to a step ratio between the gear ratio before the shift and the gear ratio after the shift, and therefore, the driving and driven rollers contact with each other with a high slipping speed. In this case, heat caused by this great slippage decreases the traction coefficient μ largely as shown in FIG. 4, and the traction coefficient μ becomes smaller than the gradient tan α of the cam slope surface of FIG. 5.

Figure 6:
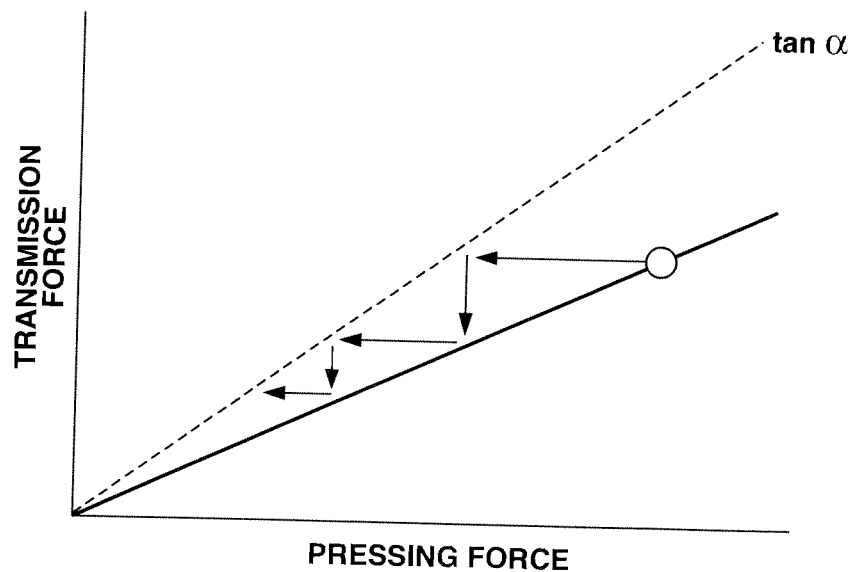
FIG. 6 is a view showing a decrease of the transmission force during a shift.
Figure 7:
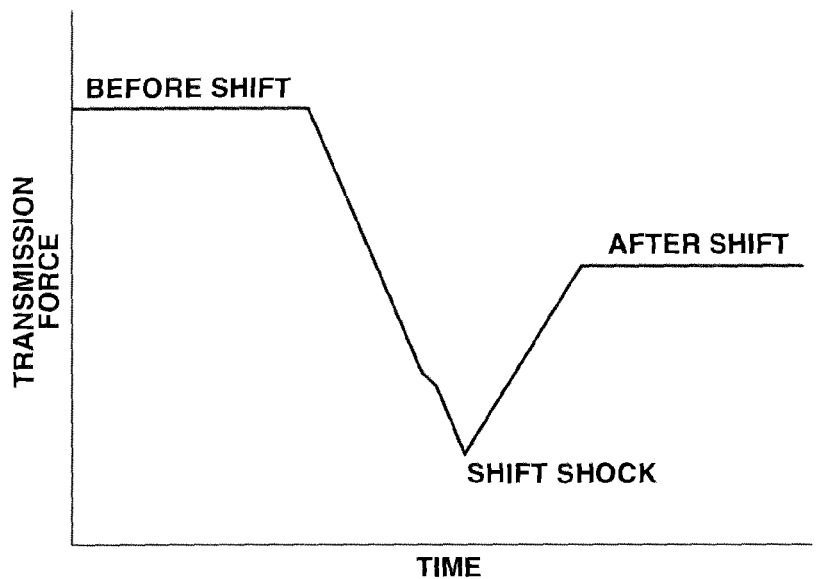
FIG. 7 is a time chart of the transmission force for illustrating the occurrence of a shift shock due to a decrease of the transmission force.

Therefore, the transmission force produced by the traction drive becomes smaller as compared to the force driving the roller by the input torque inputted to the driving roller. Consequently, the rotational speed of the driving roller is increased, the slipping speed is increased accordingly, and the traction coefficient μ is further decreased. In this case, the transmission force becomes smaller and the pressing force produced in proportion to the transmission becomes also smaller. Therefore, a cycle of further decreasing the transmission force is repeated (FIG. 6). The transmission force is equal to the traction force X the pressing force. During the shift operation, both the traction force and the pressing force become smaller. Therefore, the transmission force is decreased greatly (FIG. 7) and a shift shock is increased.

Figure 8:
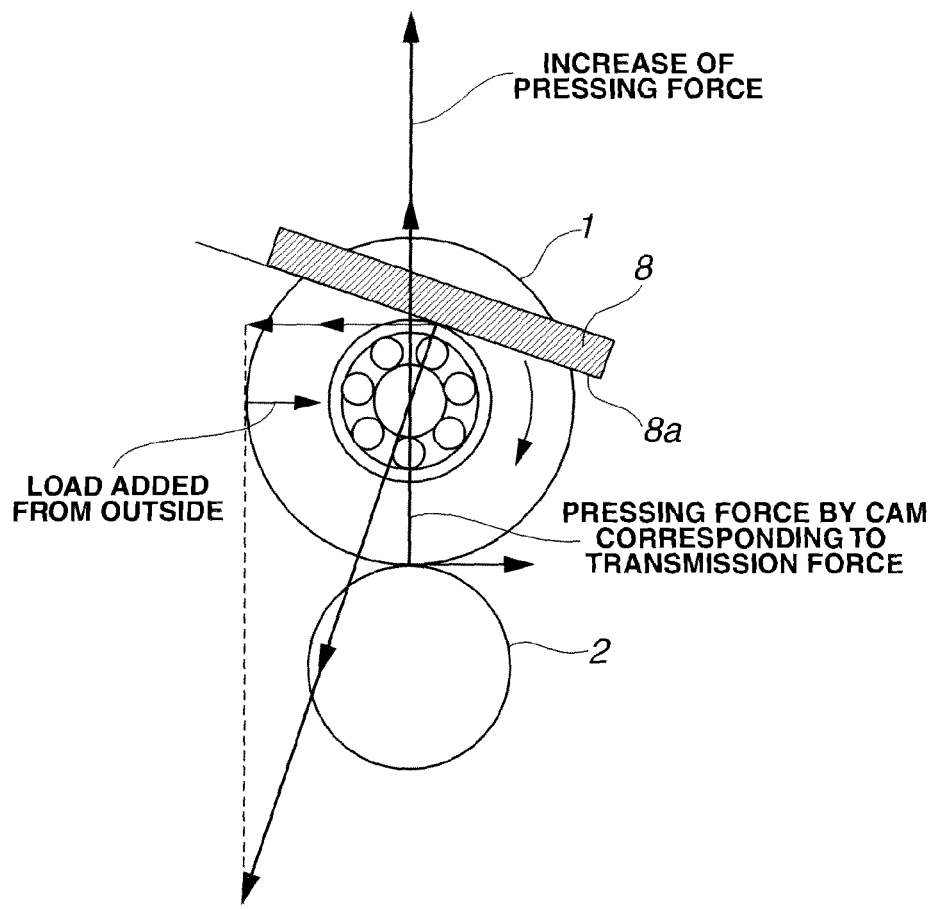
FIG. 8 is a side view of the friction drive transmission apparatus for illustrating a load imparting operation in the first embodiment.

In the case of the friction drive transmission apparatus according to the first embodiment, by contrast, there is provided the pressing force imparting means or device (cam 10+load adding means 10) for increasing and decreasing the pressing force so as to smoothen variation of the transmission force during the shift operation. At the time of the shift operation, as shown in FIG. 8, in addition to the pressing force (load) produced by the cam in accordance with the transmission force, the load added by the load adding means 10 acts as the pressing force, so that a decrease of the pressing force is restrained.

Figure 9:
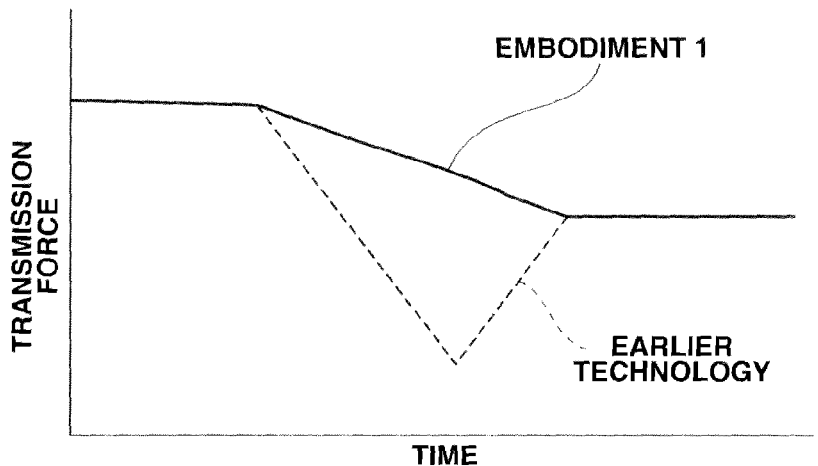
FIG. 9 is a time chart of the transmission force for illustrating a shift shock restraining operation in the first embodiment.

FIG. 9 is a time chart of the transmission force for illustrating operation of adding the pressing force at the time of a shift operation according to the first embodiment. In the first embodiment, the apparatus can achieve a smooth shift operation free of a decrease of the transmission force (=traction force X pressing force) by the addition of the pressing force, and reduce a shift shock.

Moreover, in the first embodiment, the pressing force imparting means includes the cam member 8 having the cam slope surface 8a, 8b forming the angle α with respect to a tangent line at the contact point between the rollers 1 and 2, and the load adding means 10 arranged to vary or increase/decrease the pressing force from the outside. Therefore, the pressing force imparting means can produce a great pressing force by amplifying the load applied by the load adding means 10, with the cam slope surface 8a, 8b. Accordingly, the required magnitude of the load applied from the outside is small, and the load adding means 10 can constructed in the form of a compact construction.

Moreover, in the first embodiment, the load is applied to the cam follower 5a, 6a of the driving roller support bearing 5, 6. The application of a force directly to the rotating roller would cause slippage in the load applying portion and a great friction. However, in the case of the first embodiment, the load is applied contiguously to the cam follower 5a, 6a of the driving roller support bearing 5, 6 which is not almost rotated, so that no friction loss is caused.

The following is explanation on effects. The friction drive transmission apparatus according to the first embodiment can provide the following effects.

(1) There is provided the pressing force imparting means or device arranged to vary the pressing force applied to the roller pair in an increasing or decreasing direction to vary the frictional transmission force between the rollers 1 and 2 smoothly during a shift operation. Therefore, it is possible to reduce a shift shock.

(2) The pressing force imparting means is composed of the cam 8 including the cam slope surface 8a, 8b abutting on the driving roller support bearing 5, 6, and having the angle α with respect to a tangent line at the contact point between the rollers 1 and 2, and the load adding means 10 arranged to increase and decrease the pressing force applied to the driving roller 1. Therefore, it is possible to produce the pressing force of a great magnitude with a small load, and to make the apparatus compact.

(3) The load adding means 10 is arranged to apply the load to the cam follower 5a, 6a of the driving roller support bearing 5, 6. Therefore, it is possible to reduce the frictional loss at the time of load application without the need for providing a friction reducing element such as bearing in the contact portion between the load adding means and the roller.

Embodiment 2

A second embodiment is an example in which the load is applied during a shift so as to hold the pressing force at a level before the shift, and the application of the load is terminated after the end of the shift.

Figure 10:
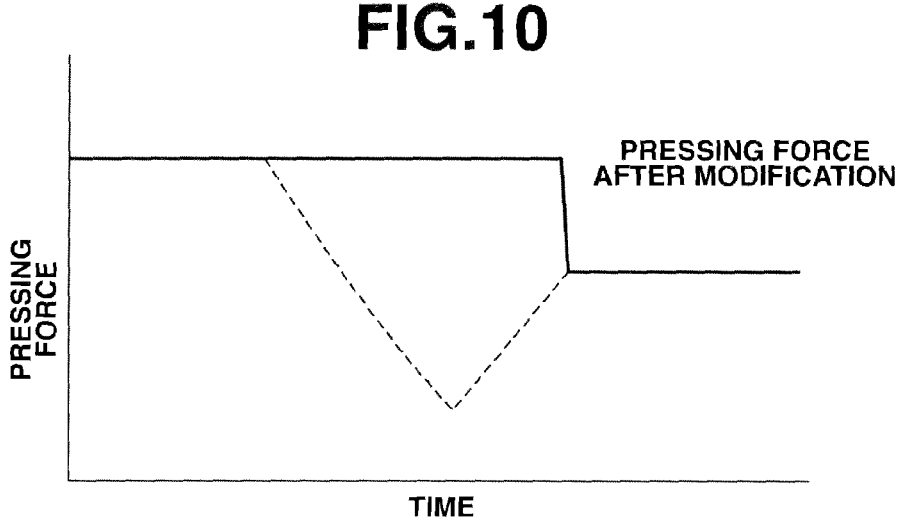
FIG. 10 is a time chart of the pressing force for illustrating the load adding method according to a second embodiment.

As shown in FIG. 10, in the second embodiment, the load adding means 10 adds the load so as to hold the pressing force unchanged at the level before the shift operation, from the start of the shift or shift operation until the end of the shift or shift operation, and terminates the addition of the load so that the load is not added after the shift or shift operation is finished. In the other points, the second embodiment is the same as the first embodiment shown in FIGS. 1 and 2, so that further explanation and illustration are omitted.

Figure 11:
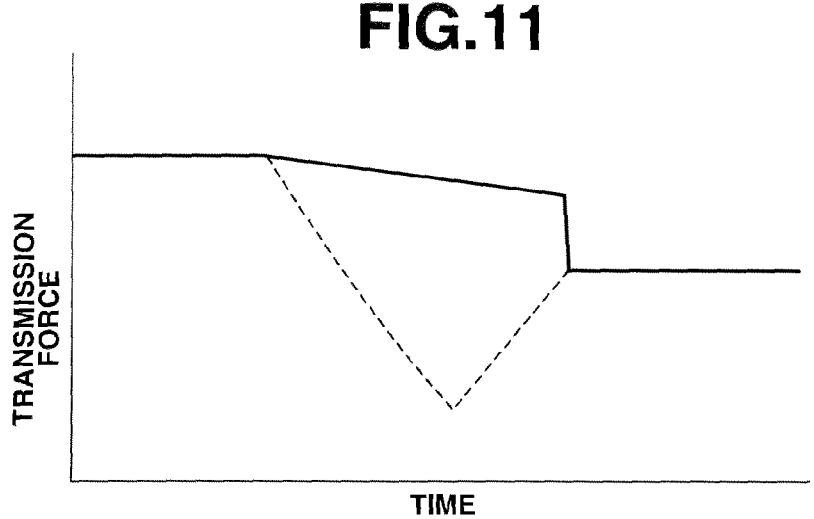
FIG. 11 is a time chart of the transmission force for illustrating the shift shock restraining operation in the second embodiment.

Operations are as follows. In the second embodiment, in addition to reduction of the shift shock by avoiding a decrease of the transmission force during the shift as in the first embodiment, the control can be simplified (FIG. 11) since the pressing force is simply held constant during the shift operation. When the addition of the load is ended, the transmission force is decreased sharply. However, the shift operation is finished at that instant, the transmission force does not decrease below the level of the transmission force after the shift. Accordingly, the apparatus can reduce the shift shock.

Effects are as follows. In addition to the effects (1)~(3) of the first embodiment, the friction drive transmission apparatus according to the second embodiment can provide the following effects.

(4) The load adding means 10 is arranged to vary the load to maintain the pressing force before the shift. Therefore, it is possible to simplify the load adding control.

(5) The load adding means 10 is arranged to terminate the addition of the load after the end of the shift operation. Therefore, it is possible to simplify the load adding control.

Embodiment 3

A third embodiment is an example in which the load is varied or increased/decreased so as to hold the pressing force at a level before the shift when the input torque has a decreasing tendency at the time of a shift.

In the third embodiment, when the engine torque has a tendency to decrease at the time of a shift, the load adding means 10 varies the load so as to hold the pressing force at a level before the shift. In the other respects, the third embodiment is the same as the first embodiment shown in FIGS. 1 and 2, so that further explanation and illustration are omitted.

Figure 12:
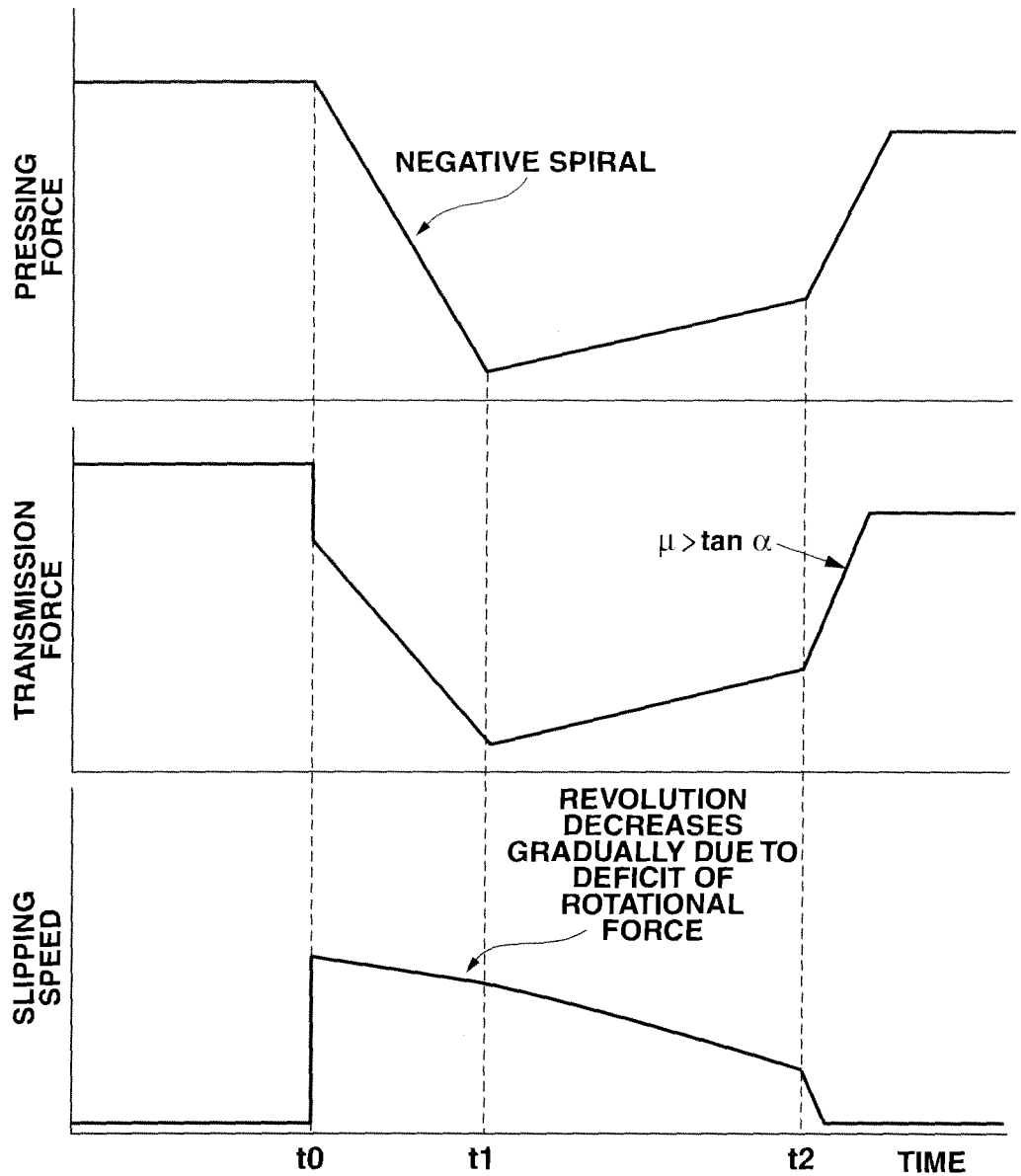
FIG. 12 is a time chart in the friction drive transmission apparatus of the earlier technology when the engine torque has a tendency to decrease during a shift.

FIG. 12 is a time chart showing operations when the engine torque (input torque) has a tendency to decrease at the time of a shift in the case of a friction drive apparatus of earlier technology. At an instant of a shift t0, a slip is produced to an extent corresponding to a step ratio. Accordingly, the traction coefficient becomes lower, and the pressing force decreases. Thereafter, the variables become smaller for a while. However, since the engine torque tends to decrease, the pressing force begins increasing from an instant t1. Then, at an instant t2, traction coefficient $\mu$ becomes greater than $\tan \alpha$ ($\mu > \tan \alpha$), and the slip is restored to a normal state. Thus, though the slip returns to normal spontaneously due to a decrease of the engine torque, a great shock is produced at the instant of the shift.

Figure 13:
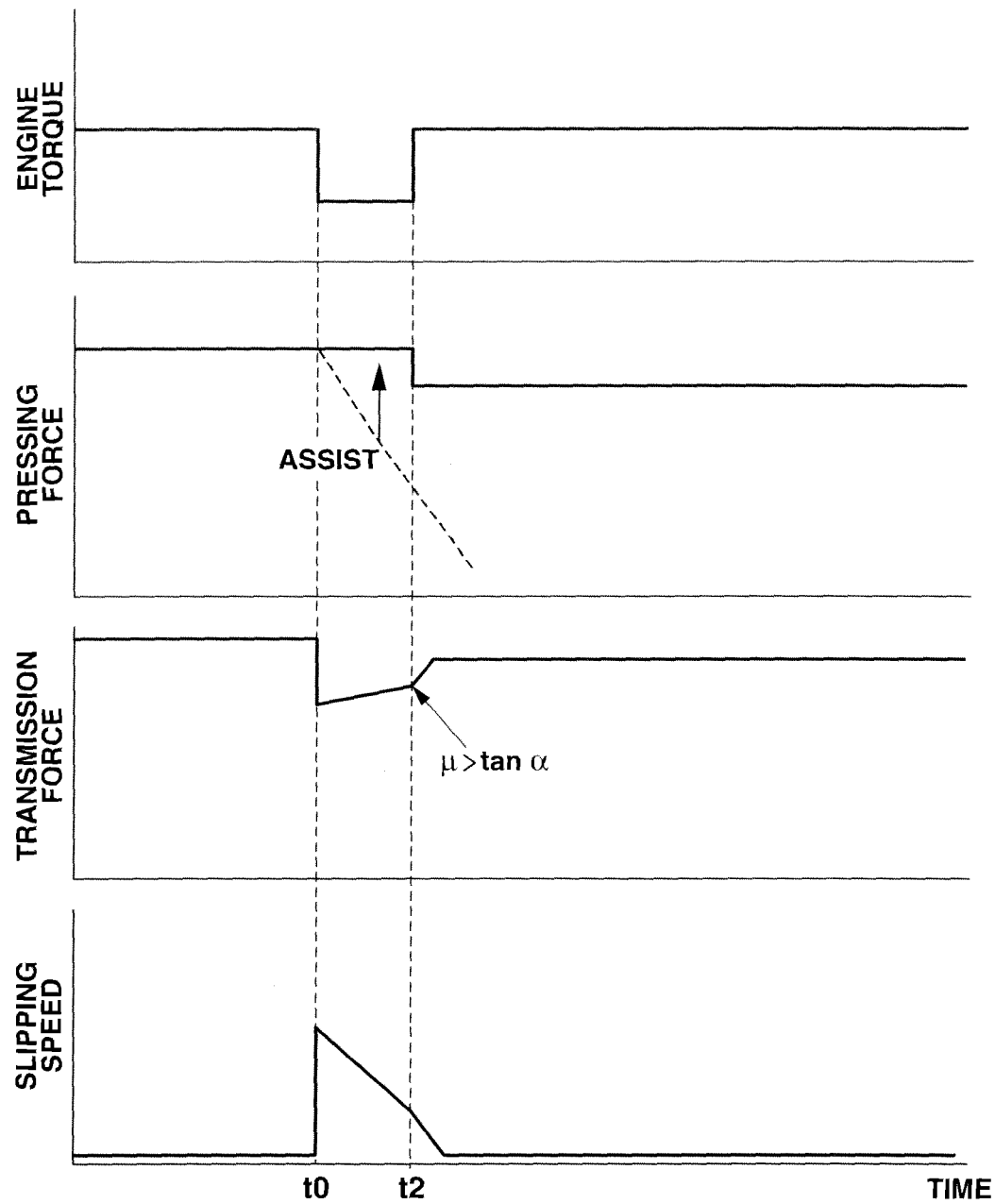
FIG. 13 is a time chart illustrating the shift shock restraining operation in a third embodiment.

In the third embodiment, by contrast, as shown in FIG. 13, the load is added to hold the pressing force unchanged from the instant of the shift t0 to the instant t2 at which traction coefficient $\mu$ becomes greater than $\tan \alpha$ ($\mu > \tan \alpha$). Therefore, a shift shock is reduced when the engine torque has a tendency to decrease.

Effects are as follows. The friction drive transmission apparatus according to the third embodiment can provide the following effect(s) in addition to the effects (1)~(3) of the first embodiment.

(6) Load adding means 10 varies the load so as to hold the pressing force before the shift when the engine torque tends to decrease at the time of a shift. Therefore, it is possible to restrain a shift shock securely by imparting an optimum pressing force suitable to the engine state.

Embodiment 4

A fourth embodiment is an example in which, when the input torque is not decreased at the time of a shift, the load is varied so as to first increase the pressing force beyond the level before the shift and thereafter to decrease the pressing force gradually.

In the fourth embodiment, when the engine torque does not degrease at the time of a shift, the load adding means 10 increases or decreases the load so that the pressing force is first increased to a level higher than the level before the shift, and then the pressing force is decreased. In the other respects, the fourth embodiment is the same as the first embodiment shown in FIGS. 1 and 2, so that further explanation and illustration are omitted.

Figure 14:
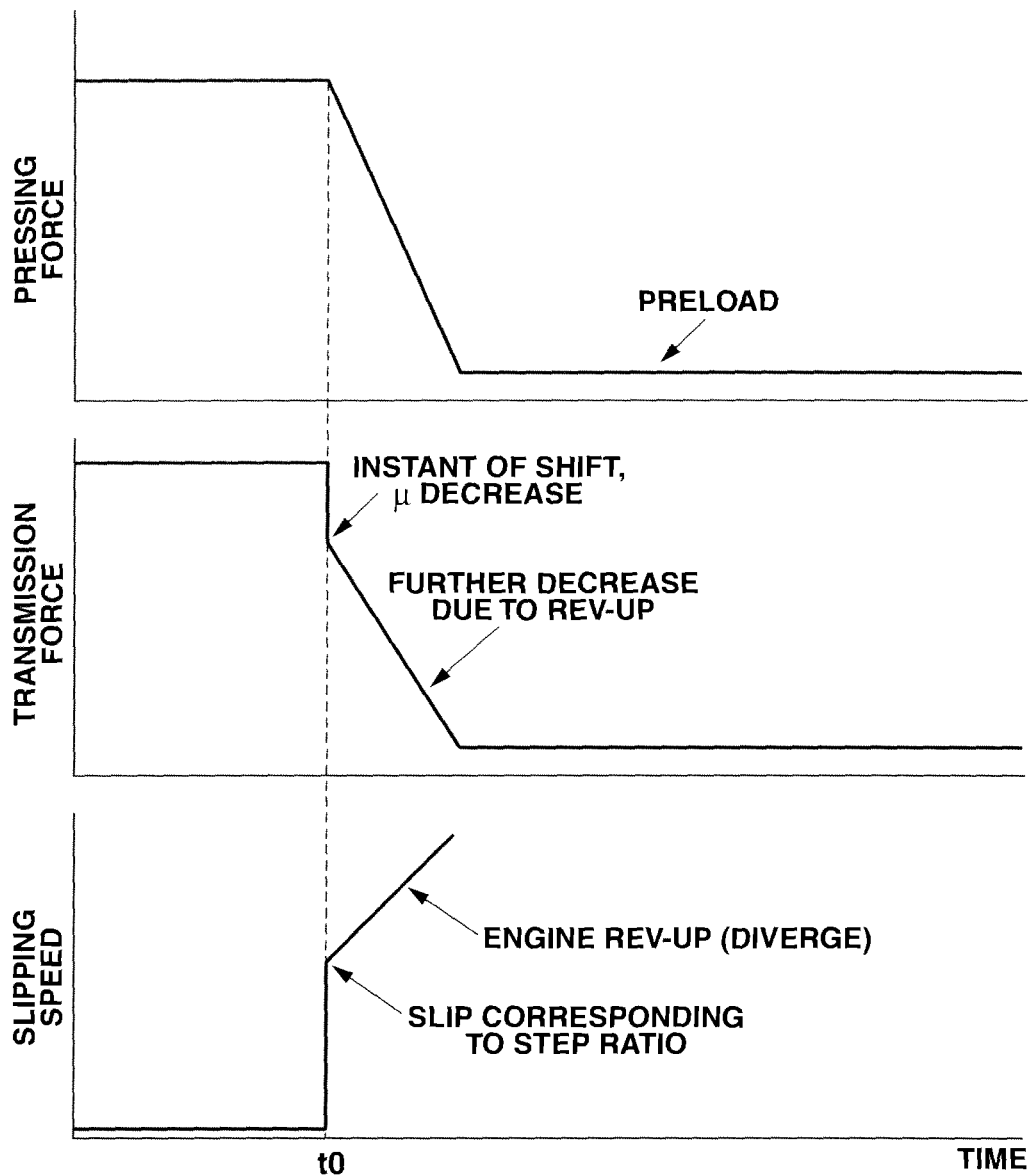
FIG. 14 is a time chart in the friction drive transmission apparatus of the earlier technology when the engine torque is not decreased during a shift.

FIG. 14 is a time chart showing operations of the friction drive apparatus of the earlier technology when the engine torque (input torque) does not decrease at the time of a shift. At an instant of a shift t0, a slip is produced to an extent corresponding to the step ratio, hence the traction coefficient $\mu$ becomes lower, and the pressing force decreases. Since the engine torque is not decreased, the engine revs up to a higher rotational speed, and the slipping speed increases. Accordingly, the pressing force and the transmission force both become smaller. Thus, when the engine torque is not decreased, a further slip is caused due to the rev-up of the engine in addition to the slip produced at the instant of the shift.

Figure 15:
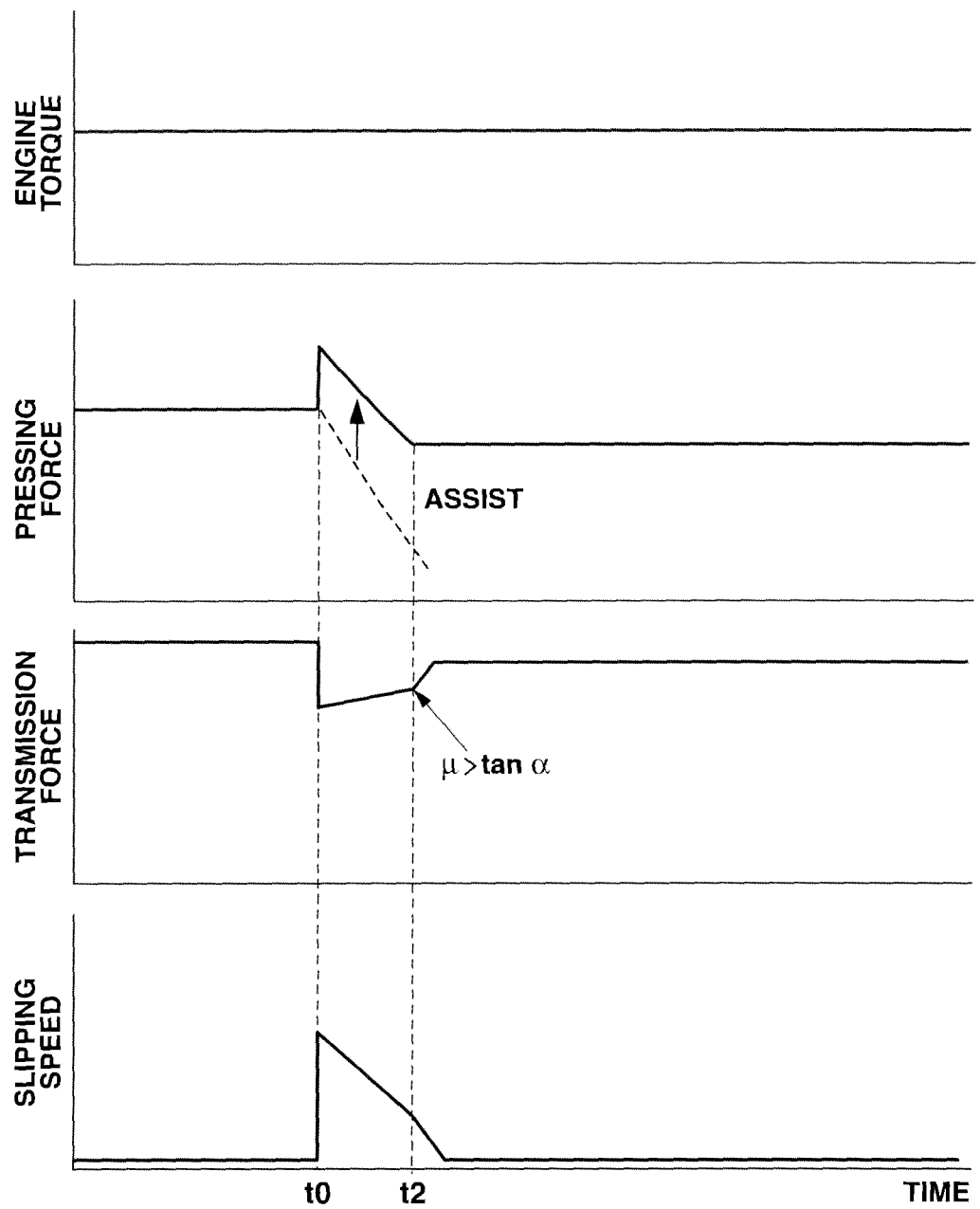
FIG. 15 is a time chart illustrating the shift shock restraining operation in a fourth embodiment.

In the fourth embodiment, by contrast, as shown in FIG. 15, the load is added in such a manner to first increase the pressing force at the instant of shift t0, and thereafter the pressing force is decreased gradually until instant t2 at which traction coefficient $\mu$ becomes greater than $\tan \alpha$ ($\mu > \tan \alpha$). Therefore, even when the engine torque is not decreased, the shift shock is restrained securely.

Effects are as follows. The friction drive transmission apparatus according to the fourth embodiment can provide the following effect in addition to the effects (1)~(3) of the first embodiment.

(7) Load adding means 10 varies the load to decrease the pressing force gradually after increasing the pressing force temporarily above the level before the shift when the engine torque is not decreased at the time of the shift. Therefore, it is possible to impart the optimum pressing force in accordance with the engine state, and to restrain the shift shock securely.

Embodiment 5

A fifth embodiment is an example in which the increasing/decreasing variation of the load is terminated when the difference between the peripheral speeds of both rollers becomes smaller than a predetermined value (representing the condition of $\mu > \tan \alpha$).

Figure 16:
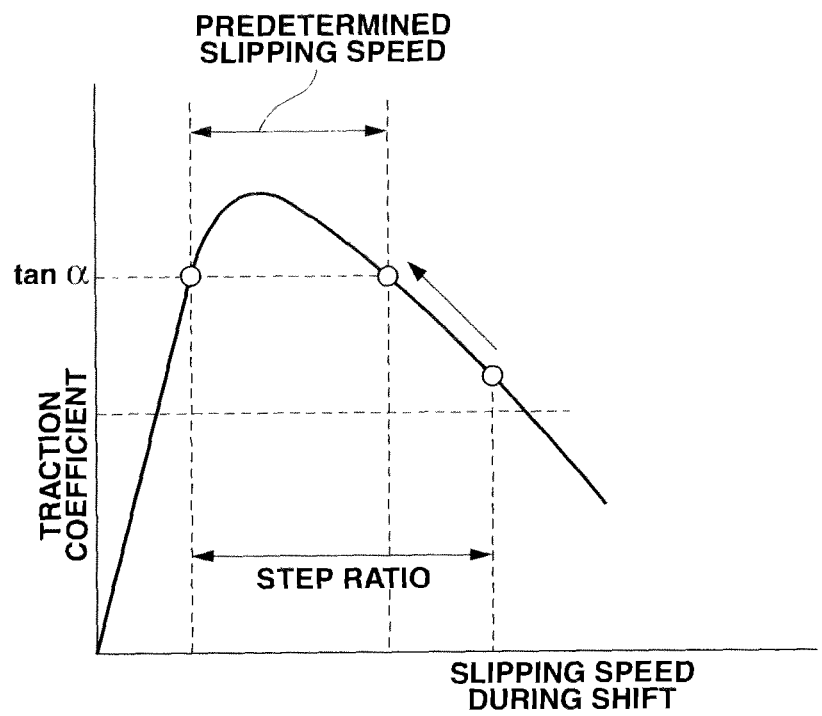
FIG. 16 is a view of a traction characteristic with respect to slip variation during a shift, for illustrating the shift shock restraining operation in a fifth embodiment.

As shown in FIG. 16, the load adding means 10 of the fifth embodiment terminates the addition of the load by judging that the slipping rate decreases with the progress of the shift operation, and the traction coefficient $\mu$ becomes greater than the gradient $\tan \alpha$ of the cam slope surface, by using the slipping rate calculated from the rotational speeds of driving roller 1 and driven roller 2, and preliminarily prepared characteristic data of an lubricating oil. The rotational speeds of driving roller 1 and driven roller 2 can be calculated, respectively, from sensed values of input shaft rotational speed sensor and output shaft rotational speed sensor which are provided in general in a vehicular transmission system. In the other respects, the fifth embodiment is the same as the first embodiment shown in FIGS. 1 and 2, so that further explanation and illustration are omitted.

Operation are as follows. In the fifth embodiment, the system detects the condition in which the slipping rate decreases and the traction coefficient $\mu$ becomes greater than the gradient $\tan \alpha$ of the cam slope surface 8a, 8b, by using the slipping rate, and preliminarily prepared characteristic data of the lubricating oil, and terminates the addition of the load in dependence on the detection. Therefore, the system can determine the best timing for terminating the addition of the load easily and accurately, and achieve smoother shift.

Effect are as follows. The friction drive transmission apparatus of the fifth embodiment can provide the following effect in addition to the effects (1)~(3) of the first embodiment.

(8) Load adding means 10 terminates the increasing/decreasing variation of the load when the difference between the peripheral speeds of both rollers 1 and 2 becomes smaller than a predetermined value. Therefore, it is possible to control the timing of the pressing force control operation accurately by using only rotational speed sensor(s), and to achieve a smoother shift.

Embodiment 6

Figure 17:
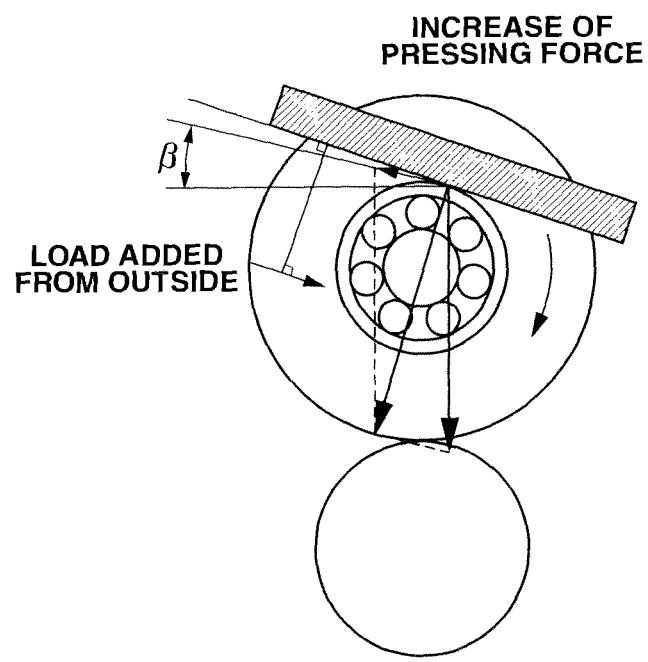
FIG. 17 is a side view of a friction drive transmission apparatus showing a load imparting direction in a sixth embodiment.

A sixth embodiment is an example in which the load applied from the outside is approximately parallel to the direction of the cam slope surface. In the sixth embodiment, as shown in FIG. 17, load adding means 10 applies a load in a direction parallel to the cam slope surface 8a, to the driving roller support bearing 5, 6. In the other respects, the sixth embodiment is the same as the first embodiment shown in FIGS. 1 and 2, so that further explanation and illustration are omitted.

Operations are as follows. By using the load F imparted by load adding means 10, and an angle β formed by F with the transmission force, the pressing force fa produced by F is given by:

$$fa=F(\sin β+\cos β/\tan α)$$

A maximum value of fa is determined with respect to β by the following equation.

$$dfa/dβ=F(\cos β-\sin β/\tan α)=0$$

Solving the equation yields β=α. Thus, the application of load F in parallel to the cam slope surface 8a provides a greatest value of fa. The effect is not so changed when the direction of F is substantially parallel to the cam slope surface.

Effect are as follows. The friction drive transmission apparatus according to the sixth embodiment can provide the following effect in addition to the effects (1)~(3) of the first embodiment.

(9) Load adding means 10 is arranged to apply a load in a direction substantially parallel to the cam slope surface 8a. Therefore, it is possible to increase the gain or amplification of the load to a greatest value, and to make compact the load adding means 10.

Embodiment 7

A seventh embodiment is an example using as the load imparting means, a hydraulic cylinder.

Figure 18:
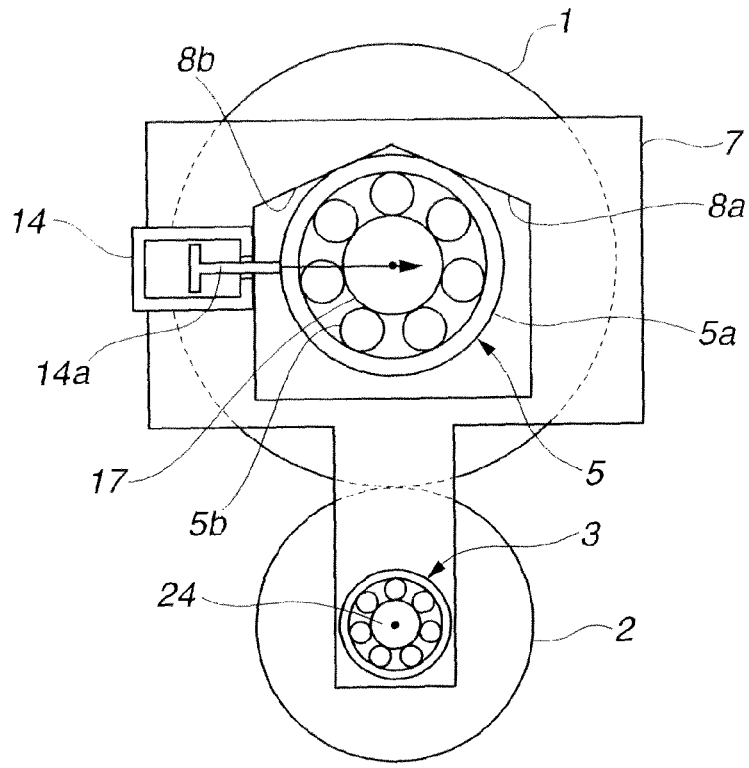
FIG. 18 is a side view showing the construction of a friction drive transmission apparatus according to a seventh embodiment.

FIG. 18 is a side view showing the construction of the friction drive transmission apparatus according to the seventh embodiment. In the seventh embodiment, a hydraulic cylinder 14 is fixed to a frame 7, and arranged to impart a load to the cam follower 5a, 5b by extending a piston 14 with an oil pressure. In the other respects the seventh embodiment is the same as the first embodiment shown in FIGS. 1 and 2, so that further explanation and illustration are omitted.

Therefore, the friction drive transmission apparatus according to the seventh embodiment can provide the effects (1)~(3) of the first embodiment.

Embodiment 8

An eighth embodiment is an example arranged to regulate or restrict a translational movement of the roller abutting on the cam slope surface at the time of a shift and to produce a load by a reaction force caused by the regulation or restriction.

Figure 19:
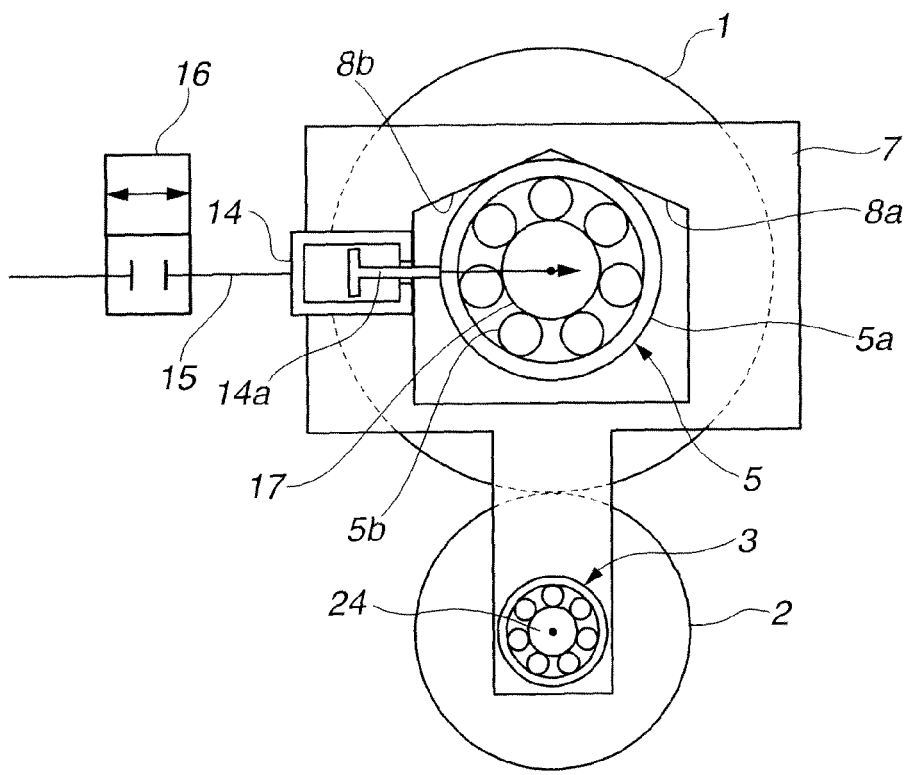
FIG. 19 is a side view showing the construction of a friction drive transmission apparatus according to an eighth embodiment.

In the eighth embodiment, as shown in FIG. 19, there is provide a hydraulic cylinder 14 which abuts on the cam follower 5a, 6a like the seventh embodiment, and there is further provided an ON/OFF selector valve or directional control valve 16 in an oil passage 15 connected with hydraulic cylinder 14. This ON/OFF selector valve 16 is set OFF at the time of a shift, and set ON otherwise. Thus, ON/OFF selector valve 16 regulates or restrict movement of driving roller 1 on the cam slope surface 8a, 8b (translational movement) during a shift operation.

Figure 20:
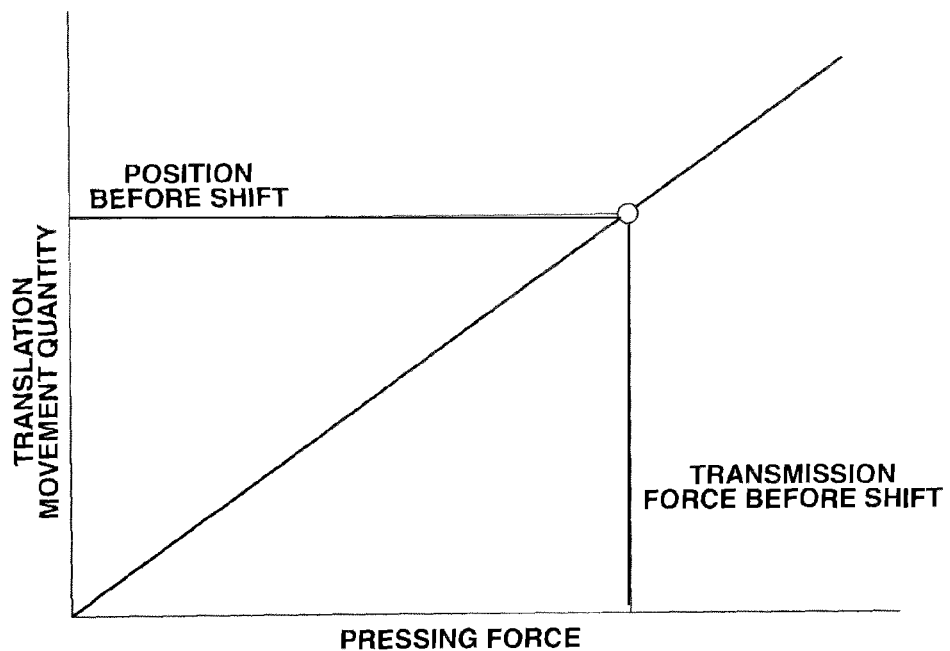
FIG. 20 is a view showing a relationship between the pressing force and a translational movement quantity of a roller.

Operations are as follows. When torque is transmitted before a shift, to absorb deformation of a contact portion between the rollers, the cam's side roller is in a state of translational movement on the cam slope surface 8a, 8b (FIG. 20). The translational movement quantity or displacement is fixed by closing the ON/OFF selector valve 16 at the instant when the shift is started. In this case, the deformation of the contact portion between the rollers is maintained, and the pressing force is held at the same value. Thus, the pressing force is imparted without the need for power source such as hydraulic pressure source. Therefore, the construction can be simplified and no power loss is caused.

Effects are as follows. The friction drive transmission apparatus according to the eighth embodiment can provide the following effect in addition to the effects (1)~(3) of the first embodiment.

(10) The load adding means is composed of the translational movement regulating or restricting means arranged to regulate or restrict translational movement or translational displacement of driving roller 1 abutting on the cam slope surface 8a, 8b. Therefore, the load can be added without power, with a construction which is more inexpensive.

Embodiment 9

A ninth embodiment is an example in which the translational movement regulating or restricting means is composed of a hydraulic damper having a restriction or throttle.

Figure 21:
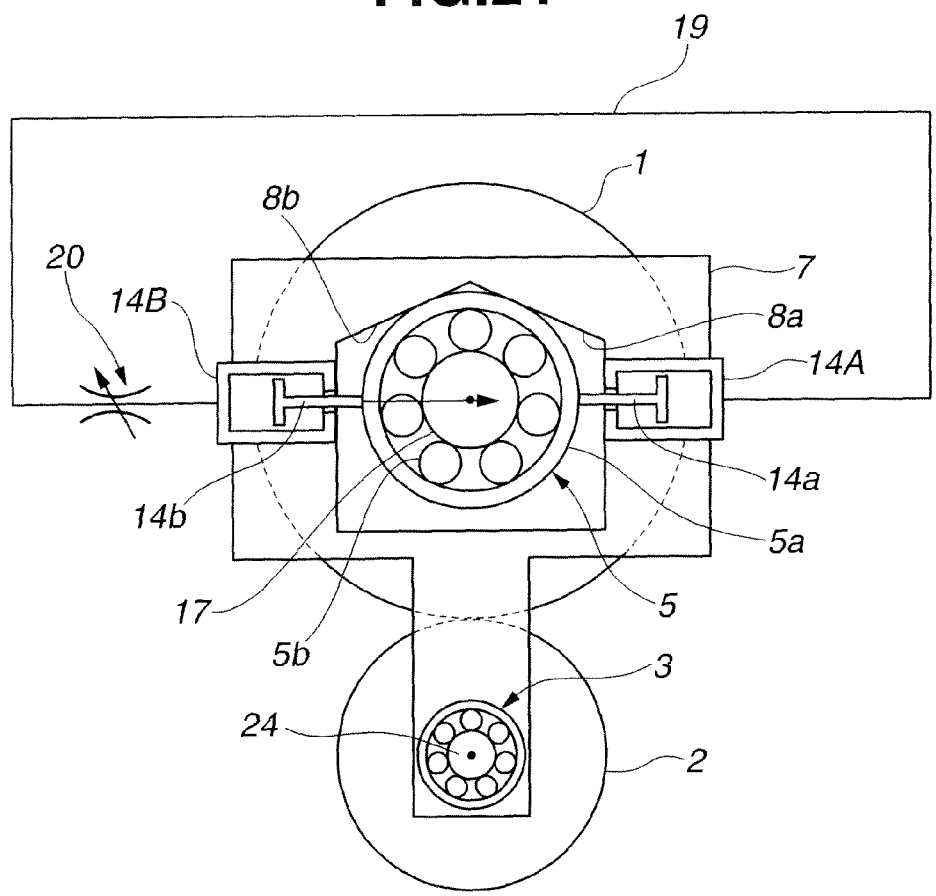
FIG. 21 is a side view showing the construction of a friction drive transmission apparatus according to a ninth embodiment.

In the ninth embodiment, as shown in FIG. 21, a hydraulic cylinder 14A having a piston 14a and a hydraulic cylinder 14B having a piston 14b are arranged in confrontation confronting each other across the cam follower 5a, 6a of driving roller support bearing 5, 6 so that the cam follower is pressed between hydraulic cylinders 14A and 14B. Oil pressure chambers of hydraulic cylinders 14A and 14B are connected together by an oil passage 19, and a restriction 20 is provided in the oil passage 19. In the example shown in FIG. 21, the restriction 20 is a throttling valve which is controlled to hold an adequate opening degree during a normal operation involving no shifting operation, and set to a fully closed state at the time of a shift or during a shift operation. The restriction is not limited to the variable type (throttling valve) as shown in the figure, but the restriction may be a restriction of a fixed type (such as an orifice). The hydraulic cylinders 14A, 14B, oil passage 19 and restriction 20 constitute a damping force producing means to produce a damping force in the direction of the cam slope, to one of the rollers.

Operations are as follows. During the normal operation during which no shift operation is performed, the throttling valve 20 is set at an adequate opening degree. Therefore, the hydraulic system can function as a damper for restraining vibrations in the drive system. When, on the other hand, a shift operation is performed, the throttling valve 20 is closed, so that the translational movement of driving roller 1 is regulated or restricted. By using a resulting reaction force, the system can impart the pressing force.

Figure 22:
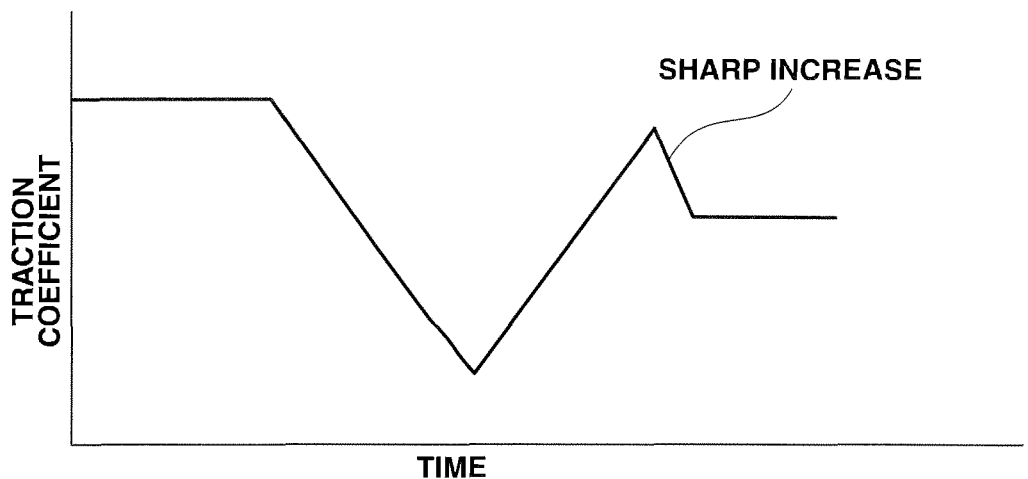
FIG. 22 is a time chart of a traction coefficient when a translational movement of a driving roller is restricted in the direction increasing the pressing force.
Figure 23:
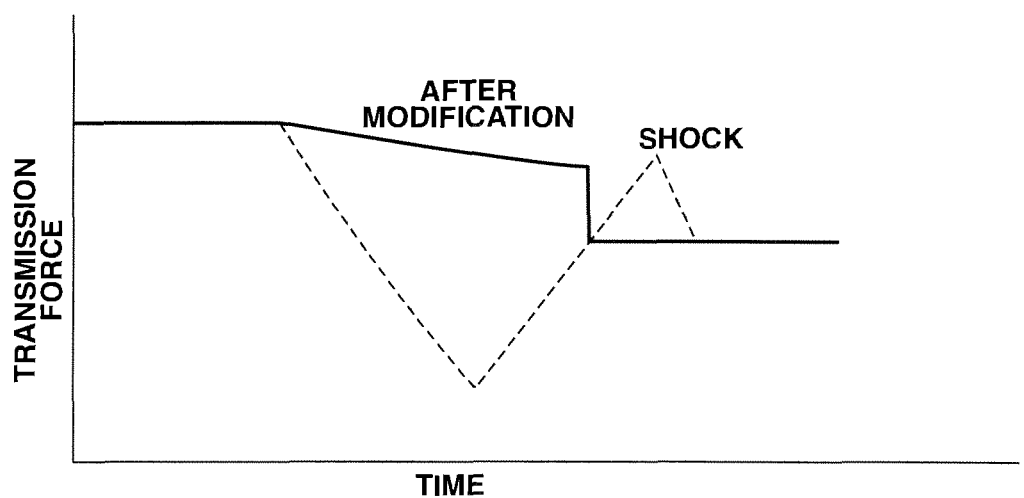
FIG. 23 is a time chart of the transmission force for illustrating the shift shock restraining operation of the ninth embodiment.

Just before the end of a shift operation, the traction coefficient μ increases with a decrease of the slip, and hence the transmission force tends to increase sharply so that there appears a possibility of a shift shock (FIG. 22). However, in the ninth embodiment, the two hydraulic cylinders 14A and 14B are arranged in the direction to confront each other, and this arrangement can regulate or restrict the translational movement of driving roller 1 even in the direction increasing the pressing force. Therefore, the translational movement regulating means can restrain the occurrence of a shift shock due to a sharp increase of the transmission force just before the end of a shift operation.

Effects are as follows. The friction drive transmission apparatus according to the ninth embodiment can provide the following effects in addition to the effects (1)~(3) of the first embodiment and the effect (10) of the eighth embodiment.

(11) The translational movement regulating means includes a hydraulic damper having a variable restriction. Therefore, it is possible to restrain the occurrence of a shift shock due to a sharp increase of the transmission force just before the end of a shift. Furthermore, it is possible to perform the function of a damper for restraining vibrations in a normal running operation involving no shift operation.

Embodiment 10

Figure 24:
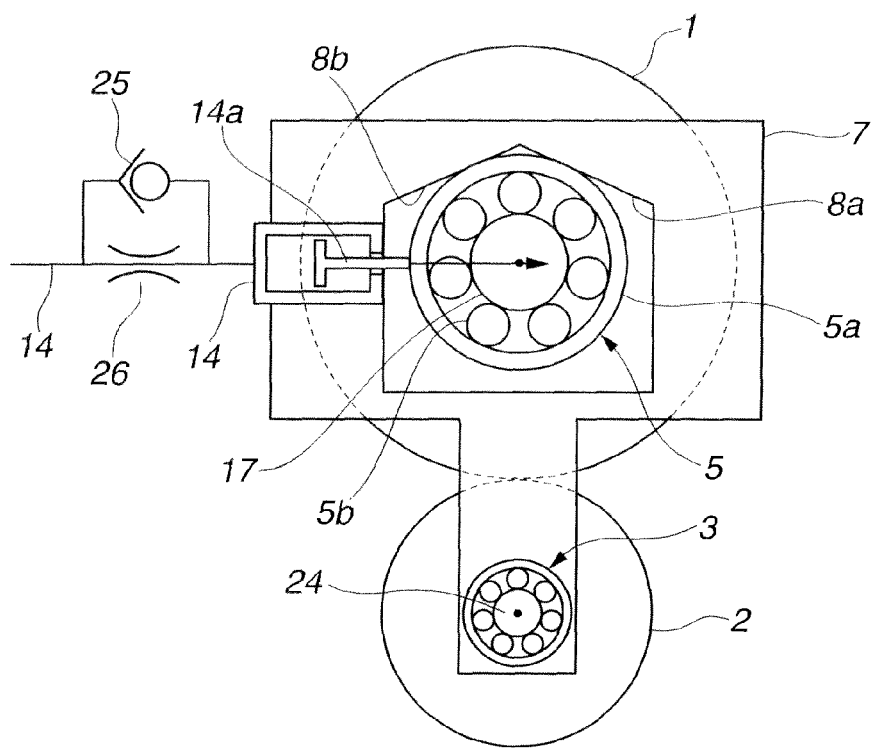
FIG. 24 is a side view showing the construction of a friction drive transmission apparatus according to a tenth embodiment.

FIG. 24 is a side view showing the construction of a friction drive transmission apparatus according to a tenth embodiment. The tenth embodiment is an example in which the ON/OFF selector valve 16 of the eighth embodiment shown in FIG. 19 is replaced by a check valve 25 and an orifice 26 provided in parallel with respect to an oil passage 14.

In the case of a rightward movement as viewed in FIG. 24, the check valve 25 is opened, and therefore the piston 14a of hydraulic cylinder 14 can move freely. However, in the case of a leftward movement, check valve 25 is closed, and orifice 26 functions as the flow restriction, so that the movement of piston 14a is regulated.

The tenth embodiment is the same in operation as the ninth embodiment. However, as compared to the ninth embodiment arranged to control the open/close state of the throttling vale 20 to regulate the movement of piston 14a, the mechanism of the tenth embodiment can be simplified because no actuator is used for actuation.

Embodiment 11

An eleventh embodiment is an example in which the translational movement regulating means is constructed by a friction brake.

Figure 25:
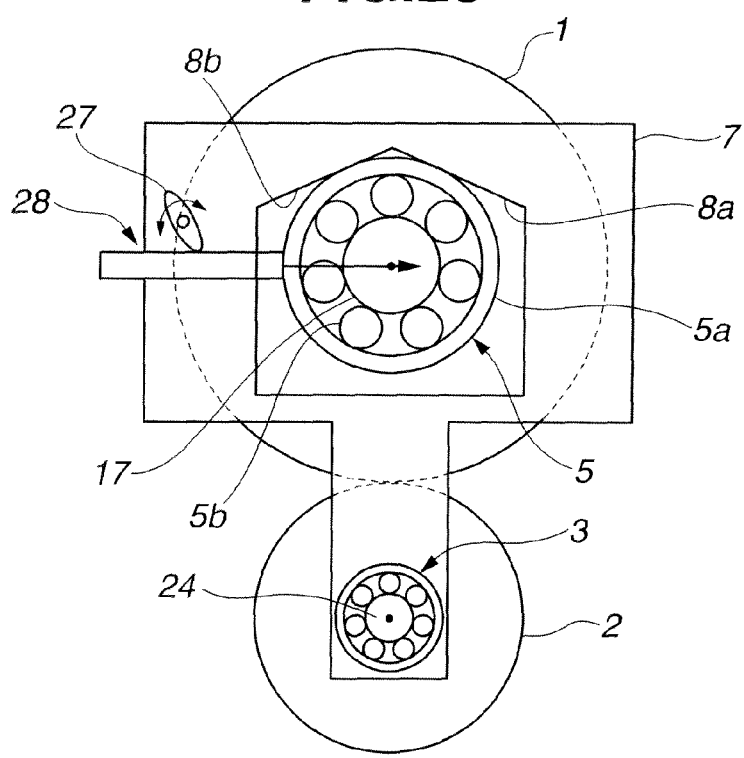
FIG. 25 is a side view showing the construction of a friction drive transmission apparatus according to an eleventh embodiment.

As shown in FIG. 25, the eleventh embodiment uses, as the translational movement regulating means, a one-way clutch 28 using sprag(s) 27. The sprag 27 is connected with a motor not shown, and the brake and free are controlled.

Operations are as follows. At the time of a shift, the one-way clutch 28 is locked by rotating the sprag 27 with the motor. Therefore, one-way clutch 28 regulates movement of driving roller 1 and thereby produces a pressing force. Unlike the hydraulic cylinder, no seal is required, so that the mechanism can be simplified.

Effects are as follows. The friction drive transmission apparatus according to the eleventh embodiment can provide the following effects in addition to the effects (1)~(3) of the first embodiment and the effect (10) of the eighth embodiment.

(12) The translational movement regulating means includes the friction brake. Therefore, it is possible to simplify the mechanism.

Other Embodiment

Although the best mode(s) for realizing the friction drive transmission apparatus of the invention has been described above by reference to certain embodiments of the invention, the invention is not limited to the embodiments described above. Changes in design and additions are permissible within a purview not departing from the gist of the invention according to each of the claims.

For example, in the first embodiment, the pressing force is increased to restrain a shift shock on the assumption that the transmission force is made smaller than the driving force by a decrease of the pressing force. However, the transmission force may become excessive at the time of shifting. Therefore, in such a case, it is necessary to decrease the pressing force. When the step ratio is small, and the traction coefficient μ is high, the transmission force becomes extremely greater than the driving force. Therefore, the rotational speed of driving roller decreases abruptly during a shift, and the transmission force is increased impulsively by its moment of inertia, so that an excessive shift shock is caused. Therefore, in this case, it is possible to restrain a shift shock due to an excessive increase of the transmission force, by decreasing the pressing force.

Moreover, although the friction drive transmission apparatus of the present invention is applied to a three speed transmission or speed change apparatus in the embodiments, the present invention is applicable to four speed transmission, five speed transmission or multi-speed transmission having seven or more speeds. In the embodiments, only the driving roller is arranged to abut against the cam member. However it is optional to provide a cam member only to the driven roller or to provide cam members to both of the driving and driven rollers.

The friction drive transmission apparatus of the present invention is applicable to wide varieties of applications such as industrial equipment requiring speed increasing function, speed decreasing function or speed changing function, without being limited to application to speed increasing/decreasing apparatus or speed change transmission for a vehicle. In these applications, too, the invention can provide operations and effects similarly as in the illustrated embodiments.

In the embodiments of the present invention, as explained above, there is provided the pressing force imparting means (pressing force imparting device) (or pressing force imparting section) to vary or increase/decrease a pressing force imparted to a roller pair in such a manner to vary a friction transmission force smoothly during a shift. Therefore, according to the present invention, it is possible to reduce a shift shock by restraining variation of the pressing force and varying the friction transmission force smoothly during a shift.

The load adding means (load adding device or load adding section) shown in FIG. 2 may be in the form of a control system. In this case, the control system includes a controller, an actuator to add a load, and a sensor section (input section) to collect information required for a control for varying or increasing/decreasing the pressing force. The load adding means includes at least either or both of the actuator and controller. In an example shown by broken line blocks in FIG.

2, the load adding means 10 is arranged to function as an actuator, and connected with a controller 101. Controller 101 is configured to vary or increase/decrease the pressing force applied to a roller pair by controlling the actuator to cause a smooth variation of the friction transmission force during a shift operation, in accordance with information supplied from a sensor section 103. As the actuator, for example, it is possible to use a hydraulic actuator using a fluid pressure or an electrical actuator using electricity. In the ninth embodiment, when the fixed type restriction (orifice) 20 is employed, it is possible to reduce the shift shock without using the controller.

By controlling the actuator, controller 101 can vary or increase/decrease the pressing force in various modes. For example, controller 101 can control the pressing force in any one or more of the following modes: (1) To increase/decrease the load so that the pressing force is held at a level before a shift. (2) To increase/decrease the load so that the pressing force is held at a level before a shift when the input torque has a tendency to decrease. (3) To increase/decrease the load so that the pressing force is increased temporarily to a level higher than a level before a shift, and then the pressing force is decreased gradually, when the input torque does not have a tendency to decrease. (4) To terminate the increase/decrease of the load after an end of a shift or shift operation. (5) To terminate the increase/decrease of the load when the difference between the peripheral or circumferential speeds of both roller units becomes smaller than a predetermined value.

In the example of FIG. 3, the pressing force added by load adding means 10 (actuator) is increased temporarily or transiently during a shift or shift operation. Moreover, in this example, the pressing force added by load adding means 10 (actuator) is held at a minimum level (zero) in the steady state before the shift operation and in the steady state after the shift operation.

In the example of FIG. 2, the driving roller 1 and driven roller 2 are symmetrical in the manner of bilateral symmetry with respect to an imaginary median plane or saggital plane. In the view of FIG. 2, the imaginary median plane is in the form of a straight line connecting the rotation axis 1a of the driving roller and the rotation axis 2a of the driven roller. In the example of FIG. 2, the pressing force added by the load adding means 10 (actuator) extends in the direction perpendicular to the median plane, toward the rotation axis 1a of the driving roller. In the example of FIG. 2, the cam slope surfaces 8a and 8b are arranged bilaterally symmetrical with respect to the median plane. The load adding means 10 (actuator) is located on a first side of the median plane (the left side as viewed in FIG. 2), and the (forward rotation) cam slope surface 8a is located on a second side of the median plane (the right side) The pressing force added by load adding means 10 is directed from the first side to the second side.

In the example of FIG. 17, the direction of the pressing force added by load adding means 10 (actuator) is not perpendicular to the median plane, but the direction of the pressing force added by load adding means 10 (actuator) is intermediate between the direction parallel to the (forward rotation) cam slope surface 8a and the direction perpendicular to the median plane.

In the example of FIG. 21, the hydraulic cylinders 14A and 14B are arranged bilaterally symmetrical with respect to the above-mentioned median plane, on both sides of each cam follower 5a, 6a. In the example of FIG. 21, the hydraulic damper is arranged to regulate or restrict movement of the cam follower (5a or 6a) in the direction perpendicular to the median plane.

According to one of interpretations, in the illustrated embodiments, the friction drive transmission apparatus (or friction drive transmission method) comprises at least the following element(s) (element(s) of the apparatus or element (s) of the method). A pressing force imparting element (means constituting the apparatus or a step of the method) for imparting the pressing force varies or increase/decrease the pressing force applied to a roller pair in such a manner to vary a frictional transmission force smoothly during a shift operation. The friction drive transmission apparatus (or the friction drive transmission method) may further comprise a shift controlling element (means or step). The shift controlling element starts a shift control operation when a condition for requiring a shift operation is satisfied, and the pressing force imparting element increases (or decreases) the pressing force temporarily during the shift control operation. For example, the shift controlling element comprises a shift actuator such as servo motor 9. In the case of the friction drive transmission apparatus, the shift controlling element may further comprise a shift controller to control the shift actuator. For example, single controller 101 may be configured to serve as both the controller for controlling the load adding actuator, and the shift controller.

This application is based on a prior Japanese Patent Application No. 2008-043693. The contents of this prior Japanese Patent Application are hereby incorporated by reference.

The invention claimed is:

1. A friction drive transmission apparatus comprising:
   a driving roller unit and a driven roller unit which are supported rotatably, the driving and driven roller units being pressed in press contact to each other and arranged to transmit power from one of the driving and driven roller units to the other by a frictional transmission force produced in a contact portion therebetween, the driving and driven roller units comprising a plurality of roller pairs having different roller radii, at least one of the driving and driven roller units being supported rotatably on an eccentric shaft so that an inter-axis distance of each of the plurality of roller pairs is varied by rotation of the eccentric shaft, and the power is transmitted selectively by one of the plurality of roller pairs; and
   a pressing force imparting member configured to vary a pressing force imparted to the roller pairs so as to vary the frictional transmission force smoothly at a time of a shift, the pressing force imparting member comprising:
      an actuator that increases the pressing force by adding an additional force to the plurality of roller pairs; and
      a controller for the actuator, the controller being configured to:
         control the pressing force with the actuator,
         hold the additional force before a shift operation, and
         increase the additional force transiently at the time of the shift so as to vary the frictional transmission force smoothly at the time of the shift.

2. The friction drive transmission apparatus as recited in claim 1, wherein the pressing force imparting member comprises:
   a cam member including a cam slope surface abutting on a rotation support portion of at least one of the driving and driven roller units and having an angle with respect to a tangent line at a contact point between both roller units; and
   a load adding member configured to vary a load imparted to the at least one of the driving and driven roller units through the cam slope surface the load adding member comprising the actuator and the controller.

3. The friction drive transmission apparatus as recited in claim 2, wherein the load adding member varies the load to hold a before-shift pressing force before a shift.

4. The friction drive transmission apparatus as recited in claim 3, wherein the load adding member varies the load to hold the before-shift pressing force when an input torque has a tendency to decrease at the time of a shift.

5. The friction drive transmission apparatus as recited in claim 3, wherein the load adding member terminates variation of the load after an end of a shift.

6. The friction drive transmission apparatus as recited in claim 3, wherein the load adding member terminates variation of the load when a difference between peripheral speeds of both roller units becomes smaller than a predetermined value.

7. The friction drive transmission apparatus as recited in claim 2, wherein the load adding member varies the load to increase the pressing force from a level before a shift and thereafter to decrease the pressing force gradually when an input torque does not have a tendency to decrease at the time of a shift.

8. The friction drive transmission apparatus as recited in claim 2, wherein the load adding member applies the load substantially in parallel to a direction of the cam slope surface.

9. The friction drive transmission apparatus as recited in claim 2, wherein the rotation support portion includes a rotating portion rotating as a unit with the at least one of the driving and driven roller units and a fixed portion supported by the cam slope surface, and the load adding member applies the load to the fixed portion.

10. The friction drive transmission apparatus as recited in claim 2, wherein the load adding member is a translational movement regulating member configured to regulate a translational movement of the at least one of the driving and driven roller units abutting on the cam slope surface.

11. The friction drive transmission apparatus as recited in claim 10, wherein the translational movement regulating member means includes a hydraulic damper having a variable restriction.

12. The friction drive transmission apparatus as recited in claim 10, wherein the translational movement regulating member includes a friction brake.

13. The friction drive transmission apparatus as recited in claim 1, wherein the controller is configured to hold the additional force at a minimum level in a steady state, and to increase the additional force transiently at the time of the shift so as to vary the frictional transmission force smoothly at the time of the shift.

14. A control method of controlling a pressing force of a friction drive transmission apparatus comprising a driving roller unit and a driven roller unit which are supported rotatably, the driving and driven roller units being pressed in press contact to each other and arranged to transmit power from one of the driving and driven roller units to the other by a frictional transmission force produced in a contact portion therebetween, the driving and driven roller units comprising a plurality of roller pairs having different roller radii, at least one of the driving and driven roller units being supported rotatably on an eccentric shaft so that an inter-axis distance of each of the plurality of roller pairs is varied by rotation of the eccentric shaft, and the power is transmitted selectively by one of the plurality of roller pairs, the control method comprising:

varying the pressing force imparted to the one of the plurality of roller pairs so as to vary the frictional transmission force smoothly at a time of a shift;

providing an actuator that adds an additional force to the one of the plurality of roller pairs so as to increase the pressing force, and providing a controller for the actuator to control the pressing force with the actuator, the controller being configured to:

hold the additional force of the actuator before a shift operation, and increase the additional force transiently at the time of the shift to vary the frictional transmission force smoothly at the time of the shift.

* * * * *